C. B. LONG.
Sight for Ordnance.
No. 36,054. Patented July 29, 1862.
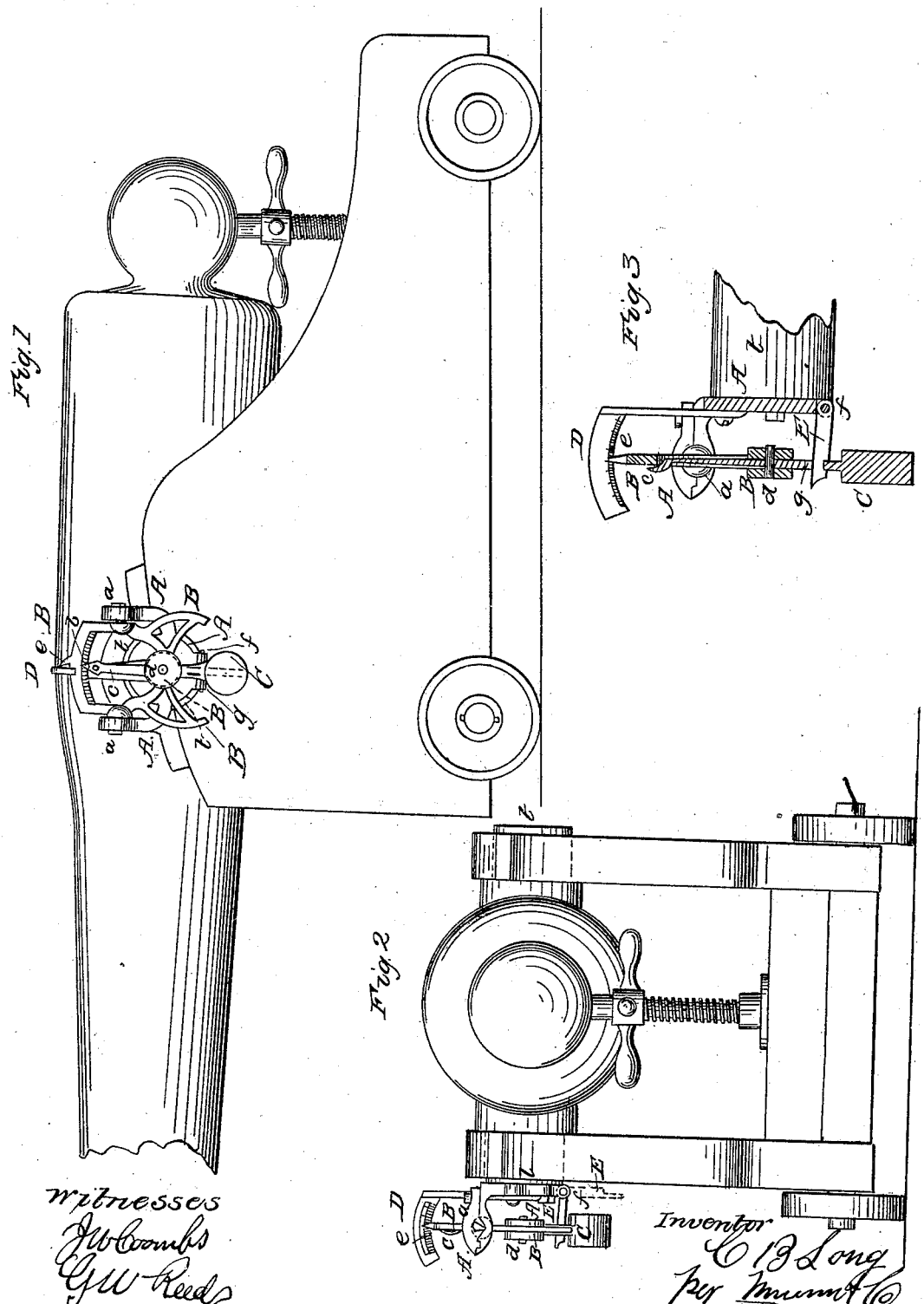

UNITED STATES PATENT OFFICE.

CHARLES B. LONG, OF WORCESTER, MASSACHUSETTS, ASSIGNOR TO HIMSELF, AUGUSTUS RICE, AND JONATHAN LUTHER.

IMPROVEMENT IN DEVICE FOR INDICATING THE ELEVATION OF ORDNANCE.

Specification forming part of Letters Patent No. 36,054, dated July 29, 1862.

*To all whom it may concern:*

Be it known that I, CHARLES B. LONG, of Worcester, in the county of Worcester and State of Massachusetts, have invented a new and Improved Device for Determining the Elevation of Cannon and other Ordnance; and I do hereby declare that the following is a full, clear, and exact description of the same, reference being had to the accompanying drawings, forming part of this specification, in which—

Figure 1 is a side view of a cannon having my invention applied. Fig. 2 is a rear view of the same. Fig. 3 is a transverse vertical section of the apparatus on a larger scale than Figs. 1 and 2.

Similar letters of reference indicate corresponding parts in the several figures.

This invention consists in the combination of an index attached to or forming part of a pendulum whose plane of oscillation is intended to be parallel with the axis of the bore of the cannon or other piece of ordnance, and a pendulous scale or dial whose plane of oscillation is intended to be perpendicular to the bore, the said scale or dial being suspended in or upon bearings which are to be attached to the trunnion or other part of one side of the piece, and the pendulum carrying the index being suspended from the said dial or scale, upon which the index will indicate the elevation of the gun under all conditions.

It also consists in the combination, with such pendulum and pendulous scale or dial, of a locking-hook so applied as to be capable of locking the scale or dial in fixed positions relatively to the gun, that the whole device may be preserved from being injured by the movements of the piece when the gun is not in actual use.

The invention is applicable to all kinds of ordnance for either fort, field, or naval service.

To enable others to make and use my invention, I will proceed to describe its construction and operation.

The device is represented in the drawings as attached to the left-hand trunnion, $t$, of the gun. A is a frame, of brass or other metal, which carries all the moving parts of the device, made with two arms containing the bearings for the knife-edged or V-shaped journals $a\ a$ of the pendulous frame or dial B, on the upper part of which the scale $b$ is engraved or otherwise suitably inscribed. The said frame A is bolted rigidly to the end of the trunnion in such a position that the common axis of the journals $a\ a$ is exactly parallel with the bore of the gun.

C is the pendulum which carries the index $c$, suspended from the lower part of the frame by means of a pin, $d$, which is arranged transversely to the axis of the journals $a\ a$. The pendulum is received in a mortise in the swinging frame B, which allows it to occupy the same plane as the axis of the journals $a\ a$, and hence its weight not only tends to keep the index $c$ upright, as shown in Fig. 1, but to keep the frame B upright, as shown in Figs. 2 and 3, and to keep the pin $d$ horizontal and perpendicular to a vertical plane passing longitudinally through the axis of the bore of the gun. The scale $b$ is on an arc concentric with the axis of the index pin or pointer $c$, and is graduated in degrees of a circle, and as the scale moves with the gun in the movements of the latter in vertical planes, and the index $c$ always remains vertical, the index will always indicate upon the said scale the elevation of the gun in degrees, and so afford facility for the adjustment of the elevation, as may be required.

In naval guns the facility with which the elevation may be obtained by this device is very great as compared with that afforded by the devices heretofore used, as the elevation can be determined notwithstanding, or without regard to, the pitching and rolling of the vessel.

D is an arc rigidly attached to the fixed frame A, and occupying a position concentric with and perpendicular to the axis of the knife-edge journals $a\ a$, and having inscribed upon it a scale of degrees. $e$ is an index attached rigidly to the swinging frame B, or consisting of a projection cast thereon, and serving to indicate upon the above-mentioned scale on D when the trunnions $t$ are level or the degree of their inclination.

E is the locking-hook connected by a hinge, $f$, with the bottom of the frame A. $g$ is a slot in the pendulum C for the reception of the said hook. When the gun is in use, this locking-hook hangs down as shown in dotted outline in Figs. 1 and 2, and does not interfere with the oscillation of the pendulum and swinging dial or frame B; but when the gun is not in use, the said hook is brought up to the slot $g$ and hooked on the lower edge thereof, and, as it fits between the sides of the said slot, it prevents the oscillation of the pendulum in any direction, and also prevents the frame B from swinging.

What I claim as my invention, and desire to secure by Letters Patent, is—

1. The combination of the pendulum C, index-pointer $c$, and swinging frame or dial B having a scale, $b$, the whole arranged to operate substantially as herein set forth.

2. The hook E, applied in combination with the frame A, and with a slot, $g$, in the pendulum C, to operate substantially as and for the purpose herein specified.

CHARLES B. LONG.

Witnesses:
GEO. P. BIGELOW,
WM. GREENLEAF.